Oct. 20, 1970  E. E. ROTH ET AL  3,534,872
DEPALLETIZER
Filed June 20, 1968  6 Sheets-Sheet 1

INVENTORS:
ERNEST E. ROTH
GLADYS J. TANNER ADMINISTRATRIX
OF THE ESTATE OF HENRY E. TANNER
BY Gravely Lieder & Woodruff
ATTORNEYS,

United States Patent Office 3,534,872
Patented Oct. 20, 1970

3,534,872
DEPALLETIZER
Ernest E. Roth, Arnold, Mo., and Henry E. Tanner, deceased, late of St. Louis County, Mo., by Gladys J. Tanner, Administratrix, St. Louis County, Mo., assignors to Alvey Conveyor Manufacturing Company, St. Louis, Mo., a corporation of Missouri
Filed June 20, 1968, Ser. No. 738,660
Int. Cl. B65g 59/02
U.S. Cl. 214—8.5                    8 Claims

ABSTRACT OF THE DISCLOSURE

Apparatus for accepting a pallet load of containers in cases and for unloading the pallet layer by layer, with each layer being reduced to a line of discharging cases. The apparatus includes means to adjust itself to a heighth of the layers in a pallet load and means to grasp the cases in each layer and substantially conform to the uneven configuration of the margins of the layers.

---

This invention relates to depalletizer apparatus and particularly to improvements in apparatus for depalletizing loads of returned containers in half-depth cases.

The unloading and handling of containers in half-depth cases in bottling plants is usually a high volume operation in which a minimum of time is allowed for moving a pallet from the truck to the place where the cases have to be separated from stacks into single file order. Heretofore, a substantial part of such an operation was accomplished by hand, but as the consumption of beverages increased it soon became impossible to depend on manual effort to keep up with the volume of containers needed to satisfy the capacity of other apparatus in a beverage plant to rinse, fill and cap containers.

While some of the problems are connected with matching the capacities of various apparatus, there is always the problem of handling cases in which the beverages are distributed and returned. Here the variations in cases and the intermingling of cases of different sizes makes it very difficult to achieve successful handling with machinery.

Therefore, it is an important object of this invention to provide simplified apparatus for receiving a pallet load of stacked cases and successively unloading the layers of cases in the stack upon the pallet.

It is also an important object of the present apparatus to accelerate the unstacking of palletized cases so that a steady supply of cases may be produced for feeding high capacity processing machinery.

Another object of the present apparatus is to provide case gripping means which will automatically adjust to case shape irregularities and assure the successful and rapid unstacking of layered cases from pallets or the like.

A preferred embodiment of depalletizer apparatus comprises an organization of parts in which there is means defining a loaded pallet receiving station, a case discharge conveyor spaced from the receiving station, case engaging means adjacent the receiving station to engage successive layers of cases and transport the case layers to case dispensing means in which the case layers are broken up into a stream of cases moving on the discharge conveyor.

A further embodiment of depalletizer apparatus for unloading stacks of cases includes case gripping means operable to conform to the alignment of cases in each layer and movable from a supply of cases to a case dispenser where the cases in layers are reduced to a single file flow on a discharge conveyor by dispensing control means.

The preferred embodiments of depalletizing apparatus will be described in greater detail in the following specification which relates to the accompanying drawings, wherein.

Figure 1:
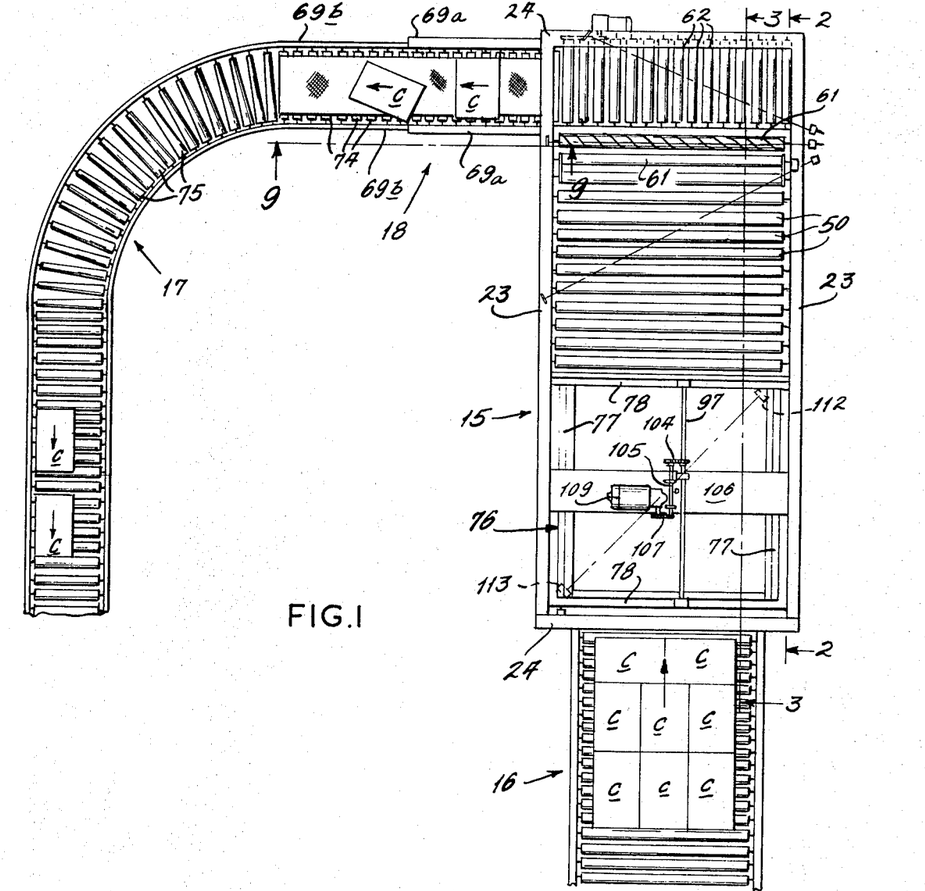
FIG. 1 is a plan view of a depalletizer in which the features of the present invention have been incorporated.

With reference to FIG. 1 the preferred apparatus is shown in plan view and includes the depalletizer apparatus 15 provided with a loaded pallet receiving conveyor 16 which feeds a stack of cases into the apparatus and a case discharge conveyor 17 which includes a conveyor section 18 which is adjustable as to length to accommodate itself to the operation of components in the apparatus 15. The conveyor 17 is the subject of an application, Ser. No. 649,912, filed June 29, 1967 by Earl H. Russell and Ernest E. Roth.

Figure 2:
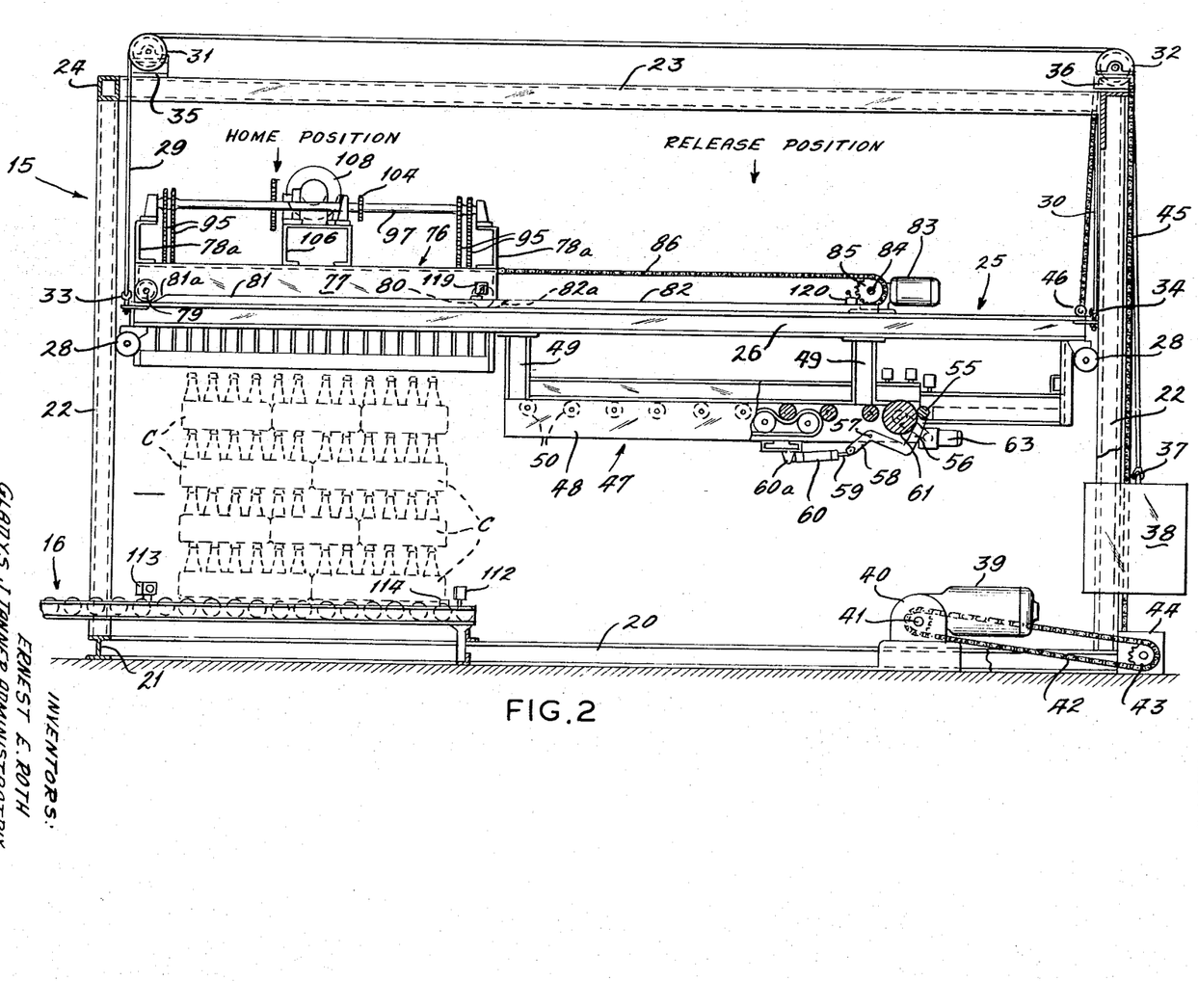
FIG. 2 is an enlarged longitudinal elevational view, partly in section, of the depalletizer apparatus seen along line 2—2 in FIG. 1.
Figure 3:
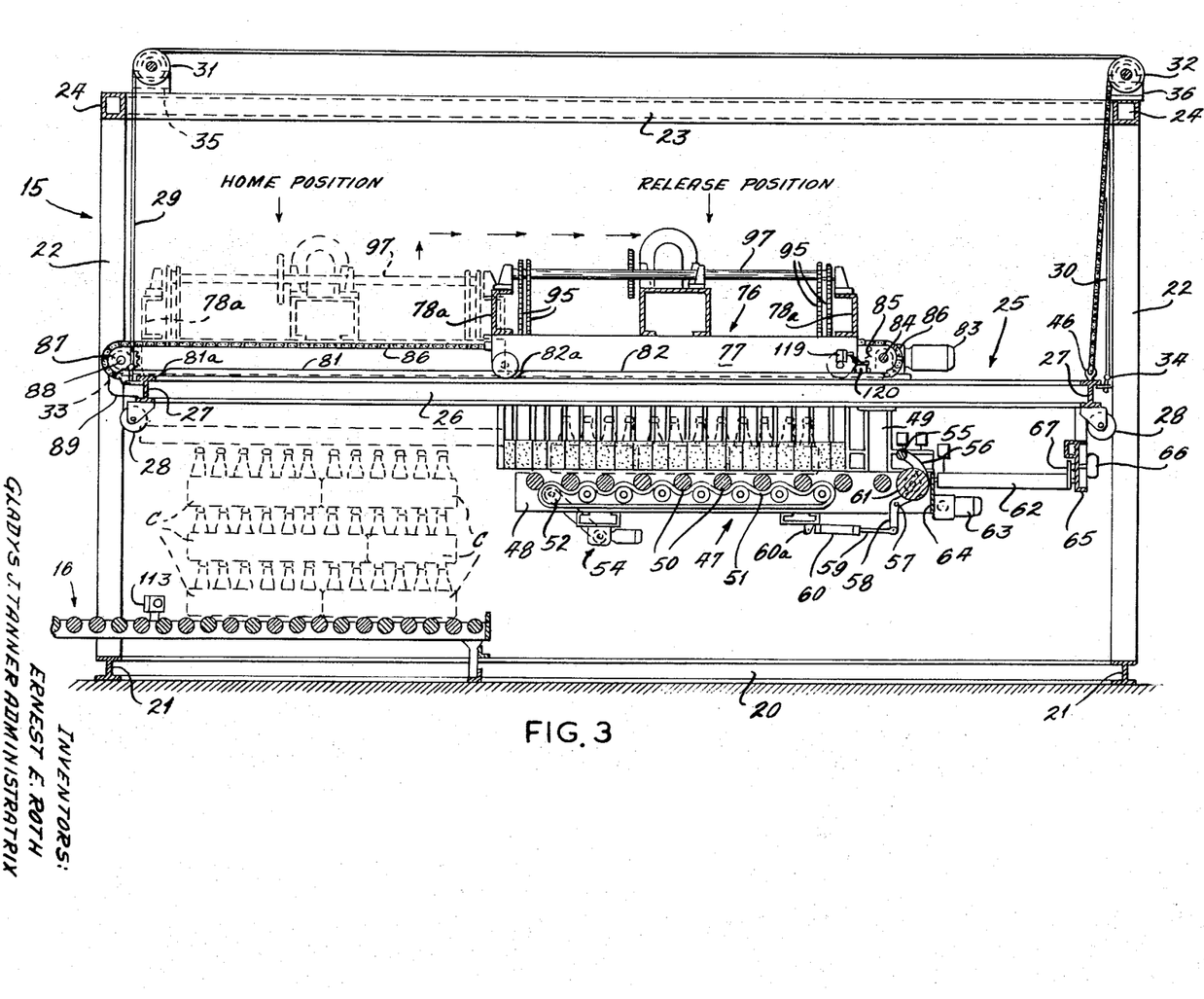
FIG. 3 is a view similar to FIG. 2, but with the apparatus in a different stage of operation, the view being taken along line 3—3 in FIG. 1.

Turning now to FIGS. 2 and 3, the depalletizer apparatus 15 includes a suitable frame composed of longitudinal base members 20 connected at the ends by transverse base members 21. Vertical columns 22 are positioned at the respective corners of the base frame members 20 and 21, and the upper ends of the columns 22 are connected by longitudinal members 23 and transverse members 24. A carriage 25 is movable within the frame structure and includes suitable longitudinal frame members 26 tied together by end members 27 (FIG. 3). The carriage 25 is guided in a vertical path of movement by suitable rollers 28 running on the respective corner columns 22. Suspension of the carriage is obtained by suitable cables 29 and 30 trained over pulleys 31 and 32 respectively. The cables 29 are connected at the left end corners of the carriage 25 as seen in FIG. 2 by eye bolts 33, and a similar arrangement of eye bolts 34 are provided at the opposite or right end corners of the carriage. The pulleys 31 are mounted on a transverse beam 35 mounted on top of the longitudinal members 23, while the pulleys 32 are similarly mounted on a transverse beam 36. As there are cables 29 at two corners and cables 30 at two opposite corners it is necessary to provide two pulleys 31 on beam 35 and four pulleys 32 on beam 36. The cables 29 and 30 are suitably connected by eye bolts 37 to a counterweight block 38 which moves up and down between the vertical columns 22. The block 38 has a weight value which is less than the weight value of the carriage 25 with the operating components mounted thereon as will be described presently. Thus, the excess weight of the carriage 25 over the counterweight 38 will tend to cause the carriage to want to move down.

Up and down movement of the carriage 25 and the assembly of components thereon is achieved by a suitable prime mover 39 having a gear box 40 from which projects a sprocket 41. A drive sprocket chain 42 for sprocket 41 engages with a driven sprocket 43 fixed to a shaft which is housed in a suitable box 44. While not shown, the box 44 encloses a reel for winding in and paying out a sprocket chain 45 which is trained over an upper sprocket (not shown) so that its opposite end may be connected to an eye bolt 46 attached to the carriage frame member 27 (FIG. 3). Thus, the prime mover 39 is able to move the carriage up or down upon reversing its direction of drive.

Still referring to FIGS. 2 and 3, the carriage 25 is provided with case dispenser means 47 which consists of a frame 48 supported beneath the carriage frame members 26 by corner located posts 49. The frame 48 supports a platform of rollers 50 which are power operated by a suitable drive belt 51 (FIG. 3) driven from an end supporting roll 52 by a sprocket chain 53 powered from the motor unit 54. The discharge end of the dispenser means 47 is provided with a gate bar 55 operated from its opposite ends by a pair of levers 56 pivoted at 57 such that an operating end 58 of each is free to be connected to the rod 59 of a fluid pressure cylinder 60. The cylinder is articulated on a pivot member 60a carried by the frame members 48. Thus, on operation of the cylinders 60 the gate bar 55 may be retracted (FIG. 2) to allow passage of cases C of containers or swung upwardly to stop cases passing (FIG. 3).

The dispenser 47 also is provided with an acceleration roller 61 at its right end, the roller having a suitable friction covering to draw cases C rapidly out of the roller bed and onto a discharge conveyor platform formed by a bed of rollers 62 mounted at the ends in frame members 64 and 65 (FIG. 3) such that the rollers are directed substantially at right angles to the bed of rollers 50 in the dispenser 47. The acceleration roll 61 is driven by a motor unit 63 connected by a drive chain in the usual manner. The bed of rollers 62 is carried by side members 64 and 65, the member 65 being arranged to carry a motor unit 66 which drives a sprocket chain or the like engaged on sprockets at the adjacent end of the rollers 62.

Figure 9:
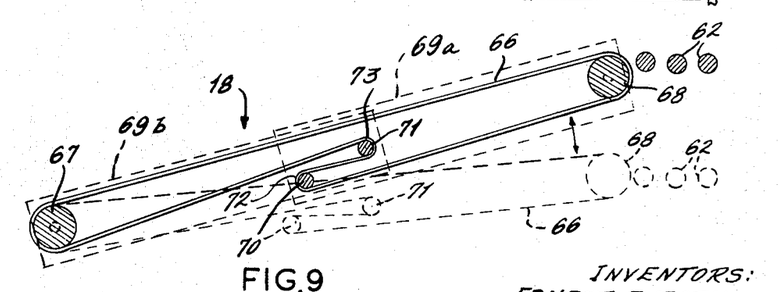
FIG. 9 is a fragmentary schematic view of the depalletizer case discharge conveyor.
Figure 10:
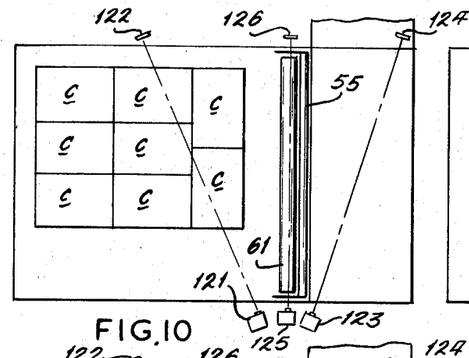
FIGS. 10, 11, 12 and 13 are plan views of the apparatus in the discharge zone, the views showing various stages of its operation to reduce a layer of cases.
Figure 11:
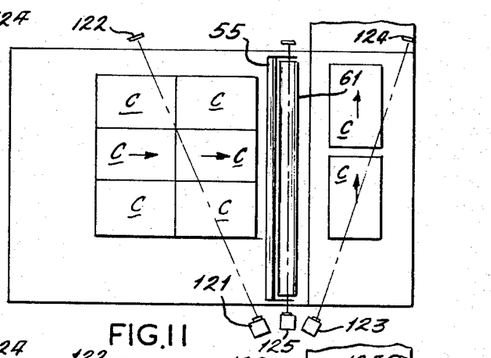
Figure 12:
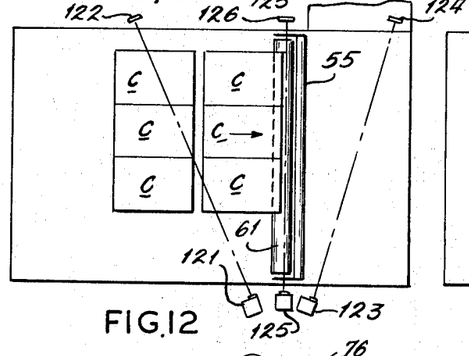
Figure 13:
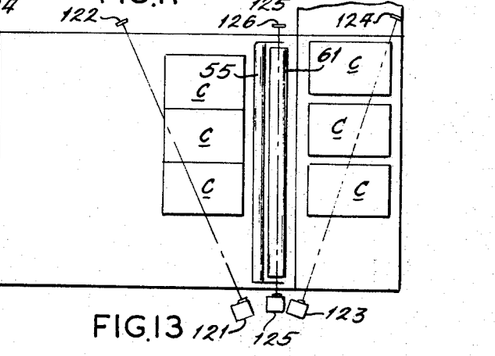

As seen in FIG. 9, since the carriage 25 is vertically movable the conveyor section 18 must be able to adapt its length to the change in length from its fixed roller 67 to its opposite roller 68 which is suitably attached to the frame members 64 and 65 of the discharge conveyor rollers 62. The conveyor 18 has side frame members 69a and 69b which are arranged in pairs with the adjacent ends telescoped such that one slack take-up roll 70 is carried by the pair of members 69a and the other take-up roll 71 is carried by the other pair of members 69b. In this manner the rolls 70 and 71 control the amount of belt 66 which is absorbed in the belt loops 72 and 73 respectively. As shown in FIG. 1, the upper reach of the belt 66 is supported on a bed of rollers 74 carried by the side members 69a and 69b.

The cases C discharged from rollers 62 are powered by the belt 66 (suitably driven by motor means not necessary to show) onto the curved conveyor section of the conveyor 17. The rollers 75 in the curved conveyor are tapered so that cases directed lengthwise from belt 66 are not turned, but cases directed crosswise of the belt 66 are turned ninety degrees to assume a lengthwise alignment by the time they reach the straight portion of conveyor 17.

Figure 4:
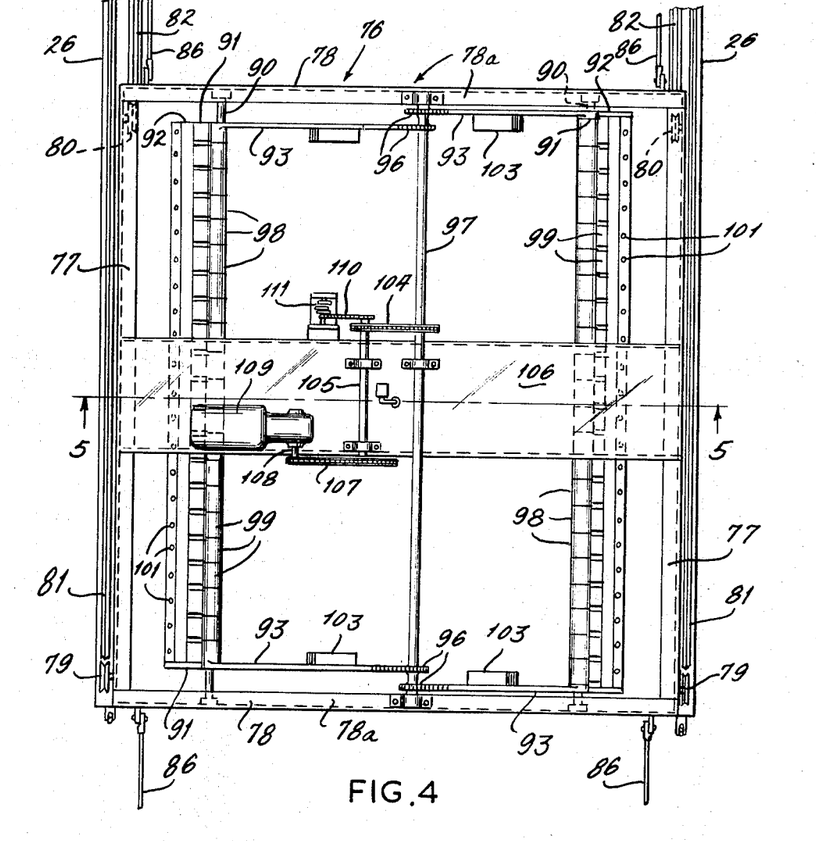
FIG. 4 is a greatly enlarged fragmentary plan view of a portion of the depalletizer apparatus shown in FIG. 1.
Figure 5:
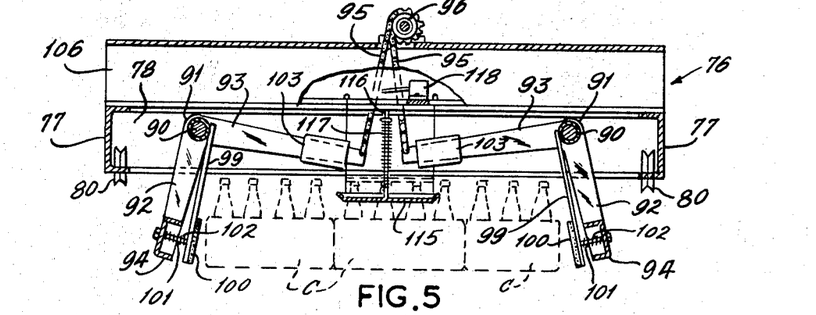
FIG. 5 is a sectional elevational view taken at line 5—5 in FIG. 4.
Figure 6:
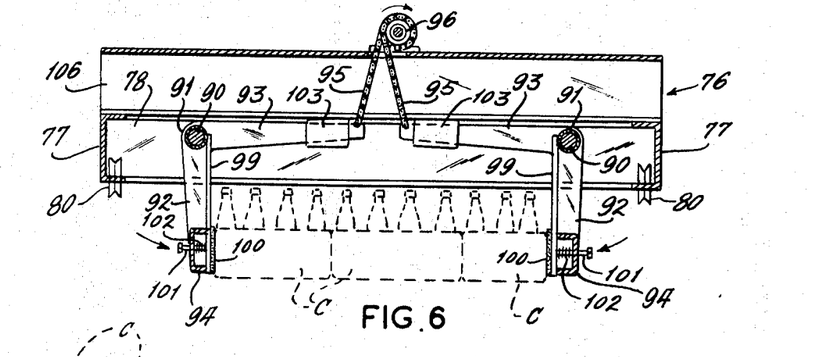
FIG. 6 is a view similar to FIG. 5 but in a different stage of operation.

Turning now to FIGS. 4, 5 and 6, the apparatus 15 is provided with a case gripping head means 76 having main side frame members 77 and main end frame members 78 connected at the ends to form a rectangular frame having grooved wheels 79 at one end of side members 77 and other groove wheels 80 at the opposite end of side members 77. The wheels 79 track with the elevating rails 81 and wheels 80 track with the elevating rails 82. The rails 81 and 82 are mounted on the top surfaces of frame members 25 and are provided to rapidly raise the frame a suitable distance so that the cases gripped therein are elevated off the underlying cases.

The gripper head frame is caused to move horizontally from the home position (FIG. 2) to the release position (FIG. 3) by motor means 83 driving a countershaft 84 directed across the frame members 25. The opposite ends of the shaft 84 are provided with sprockets 85 which engage sprocket chains 86. One end of the chains 86 is connected to the eye bolts on the nearest frame member 78 (FIG. 4). The opposite ends of the chains 86 are routed over fixed sprockets 87 on a shaft 88 carried by brackets 89 on the frame end member 27 between the vertical columns 22 at the left end of the apparatus and connected to eye bolts on the adjacent frame member 78. Thus on reverse operation of the motor means 83 the gripper head frame 76 can be moved between the home position (broken outline in FIG. 3) and the release position (full line in FIG. 3) where cases are deposited on the bed of rollers 50 for dispensing. As before noted, when the frame 76 is moved out of the home position the rails 81 and 82 function to quickly lift the frame so that the layer of cases gripped therein is broken free of the top of the next adjacent layer.

Still with reference to FIGS. 4, 5 and 6, and in part to FIGS. 2 and 3, the gripper head means 76 carries a pair of shafts 90 on which are mounted at each end right angular levers 91, each having a depending arm 92 and a counterweighted arm 93. The depending arms 92 on each of the shafts 90 are connected by a channel member 94 so that the arms move together. The arms 93 at each end frame member 78 are connected by sprocket chains 95 to sprocket wheels 96 fixed on an overhead countershaft 97 which, in turn, is carried in end bearings on end frame extension members 78a. Between the levers 90 on each shaft there are operably mounted a plurality of tubular bearings 98 and each such bearing supports a gripping finger 99. The fingers carry pads 100 at the lower ends adjacent the channel members 94. Also, each finger is provided with a guide pin 101 which slides in an aperture in the web of the channel members 94. A compression spring 102 on each guide pin 101 normally forces the associated finger to a position shown in FIG. 5, but will allow the fingers to yield. The force exerted by the springs 102 on the fingers can be predetermined by the compression rating thereof. Therefore a large gripping force can be exerted by the finger pads 100 on the sides of container cases C, and the initial positions (FIG. 5) of the respective fingers 99 can be selected as desired by selecting proper lengths of guide pins 101.

Figure 7:
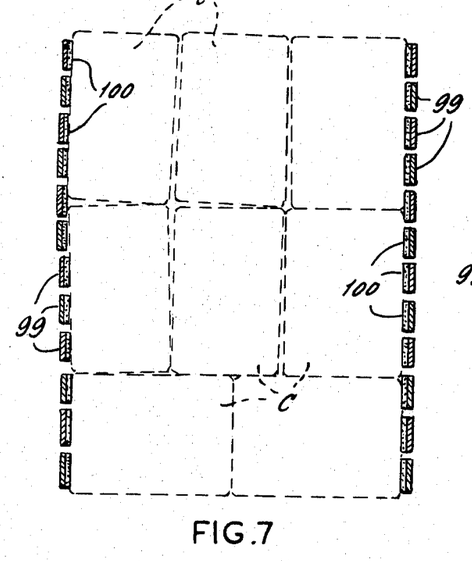
FIGS. 7 and 8 are schematic plan views of the action of the case gripping means in at least two ways it may operate.
Figure 8:
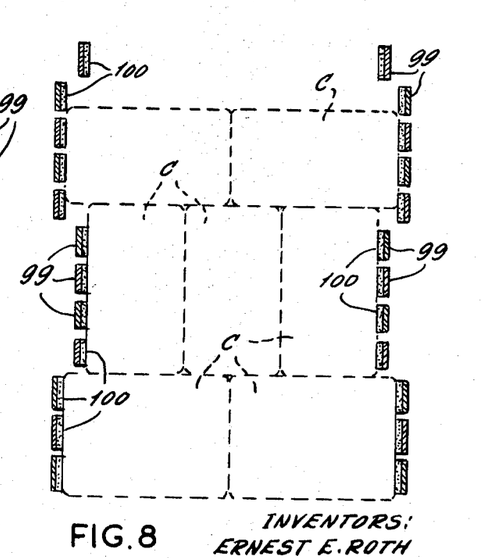

The advantage of the gripper head means 76 is seen in FIGS. 7 and 8. In FIG. 7 the cases are uniform and present a fairly even periphery in the layer so that the fingers 99 are all substantially aligned. However, as in FIG. 8, when the cases C are not all the same size or have uneven or wrapped surfaces, the spring means 102 at each guide pin 101 controls the amount of pressure and the position for each finger 99. As a result the gripper means 76 can very easily adapt itself to irregular case alignment and the like.

The sets of gripping fingers 99 carried on each shaft 90 are caused to move in toward the layer of cases by the rotation of shaft 97 acting on chains 95 to pull the chains up and swing the arms 93 upward against the force exerted by the counterweights 103. The weights 103 may be moved to add on or subtract weight, as desired. The shaft 97 is driven by a sprocket chain 104 engaged with a sprocket at one end of a power shaft 105 mounted in bearings on an overhead beam member 106 spanning the mid-zone of the frame of the gripper head 76. The other end of power shaft is connected by a sprocket chain 107 to the output shaft 108 of the prime mover unit 109. One end of the power shaft 105 is connected by a sprocket chain 110 to a rotary cam switch controller unit 111 (FIG.

4) and in this manner control functions of the gripper head can be set up in a desired sequence, in conjunction with other controls to be described in relation to FIGS. 1 and 10 to 13 primarily, and to FIGS. 5 and 6 also.

The apparatus 15 is normally shut down with the gripper head means 76 in its home position as seen in FIGS. 1 and 2. When a pallet load of four layers of half cases C of bottles is placed on the receiving conveyor 16 and pushed into the apparatus 15 from the position of FIG. 1 to that in FIG. 2, a scanner light beam projected from a light source 112 to a photocell receiver 113 is broken and also a limit switch 114 is actuated. These two events supply current to prime mover 39 to lower the carriage 25 so that the gripper pads 100 are brought to the same elevation of the top layer of cases C as in FIG. 5. The lowering of the carriage 25 and the gripper head 76 serves to bring a feeler plate 115 (FIG. 5) into contact with the bottles or the top surfaces of certain cases. The plate 115 and its actuating rod 116 is urged down by a hold down spring 117, but the rod projects upwardly in alignment with the operating arm of a limit switch 118. The actuation of switch 118 occurs when the fingers 99 are at the proper elevation to engage a layer of cases.

Actuation of switch 118 stops the descent of the carriage 25 and energizes the motor 109 (FIG. 4) to rotate the countershaft 97 in a clockwise direction (FIGS. 5 and 6) to close the fingers 99 on the cases C. The cam controller unit 111 at this time sets the controls to signal for the fingers 99 to stop and for operation of motor means 83 to cause the frame of the gripper head 76 to roll along the carriage 25 on the rails 81 and 82 which results first in a quick rise of the frame of the head 76 to lift the top cases off the next layer of cases below. The quick rise is achieved by the rails having sloped ends 81a and 82a (FIG. 2). The head 76 moves to its release position where a limit switch actuator element 119 on the side frame member 77 actuates a limit switch 120 on member 26. This action stops motor 83 with the head 76 directly over the table of rollers 50 in the case dispensing section of the apparatus. The movement of the top layer of cases C into the dispenser section interrupts a light beam between source 121 and its reflector mirror 122 (FIGS. 10 to 13). The cases C are released from the gripper head 76 when the switch 120 is actuated, and this is done by allowing the counterweighted arms 93 to pivot down, as in FIG. 5, upon reversing the direction of drive of motor 109. However, the gripper head 76 will not move to the release position until the photocell controller 121 shows the roller bed to be clear of all previous cases.

Deposit of cases C upon the rollers 50 will allow the feeler plate 115 to drop and release limit switch 118. At the same time, the cam controller 111 will reverse motor 83 which moves the gripper head 76 back to its home position (FIG. 2) to actuate a home limit switch 122 by the limit switch actuator element 119. This sets up a new cycle of operation.

While the gripper head 76 is over the rollers 50 of the dispenser means 47 the drive unit 54 is stopped so that the layer of cases C may be deposited on the non-operating rollers 50. As the head 76 clears limit switch 120 on its return travel the rollers 50 are driven to move the cases up to the gate bar 55 which is normally in its raised position of FIG. 3. The gate bar 55 is lowered by the cylinder 60 if the photocell unit 123 and its reflector 124 (FIG. 10) shows that the discharge rollers 62 are clear of previous cases. The rollers 62 being clear, the photocell signals the cylinder 60 to lower the gate bar 55, but first the photocell 125 and its reflector 126 must signal the presence of cases C at the gate bar 55. Assuming these two conditions to be satisfied, the acceleration roll 61, being driven at a higher speed by motor means 63 than the speed of rollers 50, will pick up the first cases and speed them onto the discharge rollers 62 to establish a gap space relative to the next following cases. This action causes the photocell 123 (FIG. 11) to signal the gate bar 55 to again rise and stop the following cases. The gate bar 55 will remain up until the photocell 123 signals that the rollers 62 are clear of cases due to the rotation of these rollers 62 by motor means 66 which runs continuously. The cycle of events will continue until all of the cases on the rollers 50 have been dispensed to the discharge conveyor rollers 62.

During the time the dispenser rolls 50 are disposing of a layer of cases C, the gripper head 76 will be operating to pick up a second layer of cases. This operation is signalled by the limit switch 122 and the cam controller 111 which signal the motor means 39 to lower the carriage 25 until the feeler plate 115 again is raised sufficiently by the containers in the next layer of cases to actuate limit switch 118. At this time the gripper fingers close on the sides of the cases C and the cycle of events above described repeats itself. Removal of the pallet upon which the stack of cases was brought to the apparatus will open limit switch 114, and this signals the apparatus is ready to receive another pallet load of cases.

A separate electrical circuit diagram is not believed necessary to show as the several limit switches and photocell units may be wired up in any conventional manner to accomplish the objectives of the operating sequences described. It is pointed out, however, that the apparatus performs simultaneously the function of gripping layers of cases and transporting them over the dispenser section 47 and the function of dispensing the cases from the rollers 50. In this manner, as seen in FIGS. 10, 11, 12 and 13, the layers of cases are discharged rapidly to establish a substantially steady flow of cases in the discharge conveyor 17.

Figure 14:
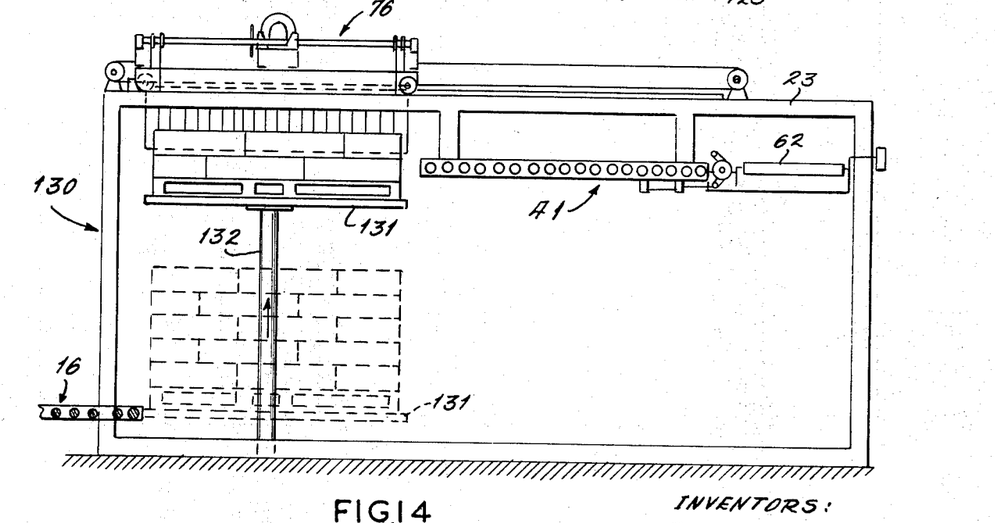
FIG. 14 is a somewhat schematic elevational view of depalletizer apparatus showing modifications over that seen in FIG. 2.

Turning now to FIG. 14, it can be appreciated that many of the components of the preferred apparatus are incorporated in the modified apparatus 130. The essential difference between the apparatus 15 and the apparatus 130 resides in the provision of mounting the gripper head 76 on the top frame members 23, and suspending the dispenser means 47 and the discharge rollers 62 from the frame members 23. With these changes there may then be used a hoist table 131 vertically movable by a ram 132 operating from a pit installed cylinder (not shown). In other respects the two forms of the apparatus are the same, and it is believed unnecessary to burden the drawings and this description with repetitive details.

The foregoing description and the accompanying drawings have set forth certain preferred forms of the present depalletizer in sufficient detail to enable those skilled in this art to make and use the same. However, changes and alterations may be suggested from the foregoing and it is intended to include all possible changes and alterations.

What is claimed is:

1. In a pallet unloading apparatus for pallets loaded with layers of cases, means defining a loaded pallet receiving station, a frame in said apparatus movable vertically toward and away from said receiving station, means on said frame for gripping successive layers of cases, power operated case dispensing conveyor means on said frame positioned laterally of said receiving station, case discharge conveyor means on said frame remote from said receiving station and in horizontal alignment with said case dispensing conveyor, first power means operably connected to said frame to move the frame vertically for locating said case layer gripping means in a first position to engage a layer of cases, second power means reversibly operably connected to said gripping means to move the gripping means with a layer of cases laterally to a second position over said case dispensing conveyor means, said gripping means releasing the engaged layer of cases onto said case dispensing means and returning to said first position to engage a subsequent layer of cases, and gate means operably disposed between said case dispensing conveyor means and said case discharge conveyor, said gate means including case stop means and case acceleration means operable in coordination to accelerate the leading case of a layer onto said case discharge conveyor and to stop the following cases.

2. The apparatus set forth in claim 1 wherein said case engaging means includes gripper means composed of sets of independently movable fingers, with the sets thereof arranged on opposite sides of a layer of cases, means connected to said sets of fingers to operate all of the fingers of each set concurrently so that the case layer is gripped between said sets of fingers, and resilient means between each finger and its operating means and operable to permit yielding of said fingers to conform said sets of fingers to the contour of the layer of cases.

3. In a pallet unloading apparatus for pallets loaded with layers of cases, means defining a loaded pallet receiving station, a case discharge conveyor spaced from said pallet receiving station, means adjacent said pallet receiving station to engage successive layers of cases, case dispenser means between said case layer engaging means and said case discharge conveyor, said case layer engaging means transporting successive layers of cases from said receiving station and depositing the cases at said dispenser means and said dispenser means moving the cases onto said discharge conveyor, rail means operatively supporting said case layer engaging means in its transporting of case layers to said case dispenser means, said rail means causing quick rise of said case layer engaging means to separate the engaged layer of cases from an underlying layer early in the transportation of the case layer toward said case dispenser means.

4. In a pallet unloading apparatus for pallets loaded with layers of cases, means defining a loaded pallet receiving station, a case discharge conveyor spaced from said pallet receiving station, means adjacent said pallet receiving station to engage successive layers of cases, case dispenser means between said case layer engaging means and said case discharge conveyor, said case layer engaging means transporting successive layers of cases from said receiving station and depositing the cases at said dispenser means, said dispenser means moving the cases onto said discharge conveyor, gate means operably mounted between said case dispenser and discharge conveyor, means operating said gate means to sequentially pass cases to said discharge conveyor in response to cases clearing said discharge conveyor, and case acceleration means between said dispenser means and discharge conveyor operable to cause a gap space between cases on said dispenser means and discharge conveyor, said gate operating means responding to cases reaching said discharge conveyor to move said gate means into said gap space.

5. Depalletizer apparatus for unloading pallets having cases thereon in stacked layers, said apparatus comprising: a longitudinal frame supported in horizontal position; a case dispensing conveyor carried intermediate the ends of said frame in horizontal position; a case discharge conveyor adjacent one end of said frame and in horizontal alignment with said dispensing conveyor; a case layer gripping means on said frame and movable therealong between a first position adjacent the opposite end of said frame and a second position over said dispensing conveyor; means operable to bring a loaded pallet into alignment with said case layer gripping means in said first position for gripping of each layer of cases; individual power means operably connected to said gripping means to move said griping means between said positions to deposit successive layers of cases upon said dispensing conveyor, and operably connected to said dispensing conveyor to deliver each layer of cases to said discharge conveyor; gate means between said dispensing and discharge conveyor means, including a powered case acceleration roller to deliver a leading case onto said dispensing conveyor spaced ahead of a following case; and means in said apparatus operable to move said frame and loaded pallet relatively vertically toward each other.

6. Depalletizer apparatus for unloading pallets having cases thereon in stacked layers, said apparatus including: a case discharge conveyor; a loaded pallet receiving station spaced from said discharge conveyor; case dispensing means adjacent said discharge conveyor; means adjacent said dispensing means operable to unload pallets layer by layer, said pallet unloading means being movable from a position aligned with said pallet receiving station to a position over said dispensing means; a frame supporting said pallet unloading means, said dispensing conveyor and a first portion of the discharge conveyor in horizontal alignment, said frame being unitarily movable in a vertical direction upon pallet unloading operation of the apparatus second portion of the discharge conveyor is secured against movement with the frame and means in said discharge conveyor to elongate said conveyor and accommodate the vertical movement of said frame.

7. The apparatus of claim 6 and including case acceleration means between said dispensing and discharge conveyors to provide a space between a leading case accelerated onto said discharge conveyor and a following case supported on said dispensing conveyor.

8. The apparatus of claim 7 and stop means adjacent said acceleration means and movable from a position retracted relative to said acceleration means to a case stop position extended above said acceleration means, and separate power means operably connected to said acceleration and stop means to operate the same.

References Cited

UNITED STATES PATENTS

| | | | |
|---|---|---|---|
| 2,980,265 | 4/1961 | Johnson. | |
| 3,173,557 | 3/1965 | Eliassen | 198—78 X |
| 3,265,186 | 8/1966 | Burton | 198—78 X |
| 3,319,760 | 5/1967 | Sheldon. | |

GERALD M. FORLENZA, Primary Examiner

G. F. ABRAHAM, Assistant Examiner

U.S. Cl. X.R.
198—32, 88; 294—87

PO-1050
(5/69)

UNITED STATES PATENT OFFICE
CERTIFICATE OF CORRECTION

Patent No. 3,534,872         Dated October 20, 1970

Inventor(s) Ernest E. Roth and Gladys J. Tanner, Administratrix of the Estate of Henry E. Tanner It is certified that error appears in the above-identified patent and that said Letters Patent are hereby corrected as shown below:

Col. 7, line 23, after "means" and before "said" cancel the word "and" and substitute therefor a comma (,).

Col. 7, line 24, after "conveyor," and before "rail", insert -- "and".

Col. 8, line 30, after "apparatus", insert -- ";a".

SIGNED AND SEALED
DEC 22 1970

(SEAL)
Attest:

Edward M. Fletcher, Jr.
Attesting Officer

WILLIAM E. SCHUYLER, JR.
Commissioner of Patents